Feb. 23, 1926.
A. SCHWARTZ
PORTABLE HEATING DEVICE
Filed Jan. 22, 1925
1,573,872
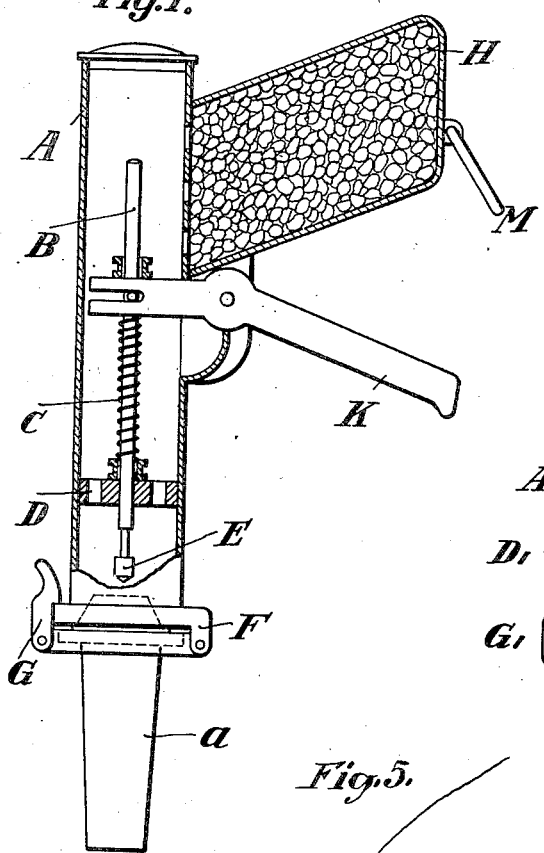
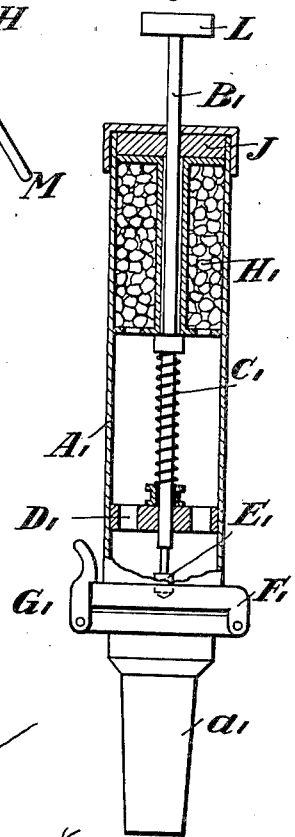
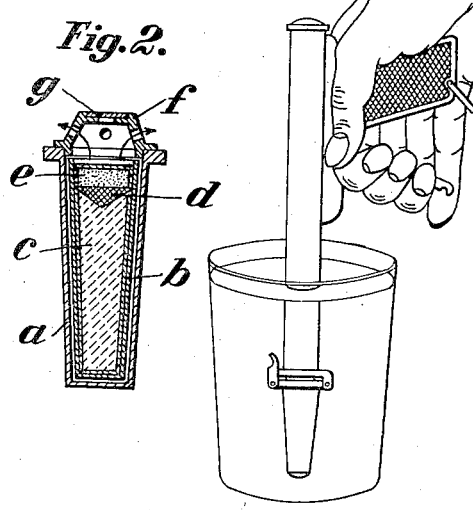
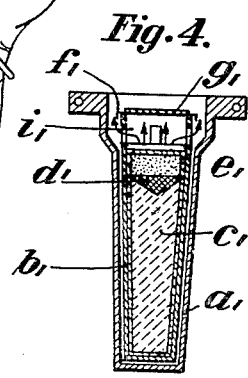
Inventor.
Alfred Schwartz
By Louis Powell
Attorney Patented Feb. 23, 1926.

1,573,872

UNITED STATES PATENT OFFICE.

ALFRED SCHWARTZ, OF SCHLACHTENSEE, NEAR BERLIN, GERMANY.

PORTABLE HEATING DEVICE.

Application filed January 22, 1925. Serial No. 4,036.

*To all whom it may concern:*

Be it known that I, ALFRED SCHWARTZ, citizen of the French Republic, residing at Schlachtensee, near Berlin, Germany, have invented new and useful Improvements in Portable Heating Devices, of which the following is a specification.

My invention relates to portable heating devices or pocket quick boilers of the immersible type in which in a known manner the reaction of chemical compounds is utilized for generating the necessary heat within the cooking vessel.

The improved heating or cooking device is distinguished from the known devices for the same purpose by the feature that the heating or boiling of the liquid or the cooking of the food takes place without any visible combustion phenomena.

In the hitherto known heaters or boilers of this type in which the ignition of the heating cartridge must be carried out while the cartridge container is open, incandescent particles and vapors escape from the device owing to the quickly developing reaction during the ignition and before it is possible to close the container completely. Such heaters are consequently handled with difficulty and cannot well be used in dwellings or in surroundings which are liable to catch fire. In order to render such an appliance generally applicable it is necessary that it should be so constructed that any danger of taking fire is entirely excluded and that it should be capable of being easily and comfortably handled.

This aim is attained in the improved heating or boiling appliance or device by effecting the ignition and reaction in a totally enclosed chamber, the ignition being initiated from the outside. In order to carry out the invention in a practical manner special cartridges have also been designed which are employed in conjunction with the improved ignition device. These improved cartridges render harmless certain inconvenient properties inherent in reaction compounds. The reaction process is frequently accompanied by a violent splashing of incandescent constituents or takes place so quickly, almost explosively, that if no special provisions are made to avoid this phenomenon the employment of a hermetically closed heater or cooker is impossible.

Systematic experiments and considerations have now led to definite constructions which serve as fundamental basis for the manufacture of the new heating device and which are realized in the embodiments of the invention hereafter described.

In the drawings affixed to this specification and forming part thereof two forms of the invention are illustrated by way of example. In the drawings:

Fig. 1 is a longitudinal section through the improved heating device with the cartridge in elevation, Fig. 2 is a longitudinal section through the cartridge, Fig. 3 is a longitudinal section through a modified heating device, Fig. 4 is a longitudinal section through a modified cartridge and Fig. 5 is a side view showing one way of using the device.

Similar letters of reference indicate similar parts throughout all the figures of the drawings.

Referring to Figs. 1 and 2, it will be seen that the device consists essentially of a heating cartridge $b$ (see Fig. 2) and a receptacle or casing $a$ in which the cartridge is burned under exclusion of the external air. With the cartridge receptacle or combustion chamber $a$ is combined a device adapted to ignite the cartridge from the outside and also a chamber for cooling or receiving the hot vapours generated during the combustion. The heating cartridge is of frusto-conical shape which together with its container is shown in longitudinal section in Fig. 2 consists essentially of a compressed reaction compound $c$, such as aluminum and a metal oxide preferably iron oxide, with a superimposed ignition mixture or priming compound $d$, preferably containing powdered aluminum and barium superoxide, and of a thick layer of sand $e$ or a similar refractory fine-grained substance. The whole is wrapped in waterproof paper and enclosed in a shell of thin sheet-metal $b$. The cartridge container is likewise of frusto-conical shape and is constructed in a well known manner of a metal of particularly high heat conductivity such as silver or copper. As illustrated in Fig. 1 the container is connected with the other parts of the heater by means of a hinge and is adapted to be pressed tightly against the cylindrical portion A of the heater by means of a lever latch G in order to exclude air and water. In view of the fact that during the entire heating process no light or fire phenomena should appear externally, the ignition must take place in a totally enclosed chamber for which reason an ignition device is housed within the tube or barrel A. This ignition device operates in such a manner that a friction priming compound E is pushed through a friction ignition disc $g$ (Fig. 2) when the lever K is drawn upwards the handle. During the last part of the motion of the lever K the ignited compound E passes through the protective layer $e$, Fig. 2 and finally comes in contact with the priming substance $d$ or with the reaction compound $c$. The ignition then continues quickly from top to bottom throughout the compound. The reduction in volume of the compound connected with the combustion is constantly made up by the layer of sand which gradually sinks lower down so that the compound in the state of vigorous reaction is almost completely sealed towards the outside. In order to protect the internal parts of the appliance and more particularly the movable parts of the ignition device against being soiled by particles of sand, ascending vapors or the like, the cartridge container is closed at the top by the dust collector $f$, Fig. 2. The collector is provided with lateral openings only for the escape of the vapors so that the solid particles carried along are detained by the ignition disc $g$ and the upper rim of the collector and prevented from moving upwards. Furthermore in the tube A is fixed a leather disc D or the like by means of which the priming bolt is continually cleaned from adhering combustion remainders during its reciprocating motion. In order that no excess pressure worth mentioning be produced in the interior of the apparatus during the combustion process in consequence of the heating of the air and the vapors developed, a chamber H is provided at the side of the cylindrical closed tube A in which the pressure of the gases is reduced and the gas is partly consumed by a suitable absorbent substance contained therein. On the outside of this expansion chamber H, which preferably contains a water absorbing material such as calcium chloride and a viscose material such as dextrin is hinged a ring M adapted to retain the lever K in its inoperative position.

In order to heat beverages or the like by means of the just described pocket quick boiler or heater, the following manipulations must be carried out:

By opening the latch G and swinging the cartridge container $a$ around the hinge F the opening of the container is made so far accessible that the heating cartridge can be introduced into it. The dust collector $f$ provided with the ignition disc $g$ is then placed upon the container $a$, after the ignition bolt B pressed downwards by the handle lever K has been provided at its lower end with the friction priming compound E. The cartridge container $a$ is then returned into its original position and forced tightly against the cylindrical part of the quick boiler by means of the lever latch G. The heater or boiler is now ready for use and can be immersed into the liquid to be heated, Fig. 5, whereupon the lever K is slowly drawn towards the handle and the reaction compound ignited. The entire reaction heat developed is then imparted or communicated to the surrounding liquid which quickly starts boiling if the heating cartridge is of ample size.

It will be obvious that the before described broad idea of the invention may be embodied in various ways according to the purpose for which the improved heater is to be used.

The embodiment illustrated in Fig. 3 by way of example is a construction in which the ignition bolt $B_1$ is directly operated in order to obtain a compact arrangement. The dust collector $f_1$ which in Fig. 1 was separate from the cartridge and which had to be placed in position separately after the introduction of the cartridge into its container, is, as Fig. 4 shows, firmly united with the heating cartridge. The cartridge consists of a conical shell of thin sheet-metal which with the exception of a small space $i_1$ is filled up by the reaction compound including the priming and the protective layer. The cylindrical wall of the space $i_1$ is provided with lateral slits for the escape of the gases in the direction of the arrows and the cover upon which is located the friction ignition disc is provided with a small opening (not shown) for the passage of the friction priming compound. The ignition of the cartridge takes place in the manner described before by depressing the bolt $B_1$ and forcing the priming compound $E_1$ through the friction disc $g_1$ whereupon the reaction compound in the cartridge is ignited. The cylindrical hollow space $i_1$ of the cartridge serves as collector for any sand particles carried along and protects the apparatus from becoming choked up by dirt, in a similar manner to the cap $f$ in Fig. 2.

Besides the great advantage that beverages or food can be heated, warmed up or cooked within a few seconds the improved device possesses the further important property that the heating process takes place in this extremely compact heater without any external indications of a combustion.

Owing to these qualities the improved pocket quick boiler represents in many cases the ideal heating device for which reason it will not only be used for domestic purposes but also out of doors, for instance during sports, while out shooting and so on, with equally satisfactory results. In all conditions in which the external phenomena of a combustion are detrimental, dangerous or not permissible, as for instance in underground mining or for troops in the field, the boiler according to this invention is the only heating device which complies with all the requirements of these special conditions.

It will be readily understood that the invention is by no means limited to the details of the parts and their arrangement shown in the drawings but that those may be modified in various ways by those skilled in the art without departing from the spirit of the invention or sacrificing any of its advantages.

What I claim as my invention is:

1. In a pocket heating device, the combination with a heating cartridge, a cartridge container of frusto-conical shape, a barrel of cylindrical shape, an ignition device adapted to be reciprocated in said barrel, means for reciprocating said ignition device the ignition as well as the combustion of said heating cartridge taking place in said cartridge container, and a chamber in communication with said barrel having means therein which is adapted for the reception and reduction of the pressure of the waste gases.

2. In a pocket heating device, the combination with a heating cartridge, a frusto-conical container for said cartridge, a cylindrical barrel, an ignition device consisting of a friction ignition plug adapted to be reciprocated in the interior of the barrel and a friction surface fixed within said barrel and adapted to cooperate with said ignition plug, means for reciprocating said plug from the outside, the ignition as well as the combustion of said heating cartridge taking place in said cartridge container, and a chamber in communication with said barrel having means therein which is adapted for the reception and reduction of the pressure of the waste gases.

3. A pocket heating device comprising a tube; a heating receptacle secured to the end of said tube being adapted to contain a heat generating material; means in said tube for igniting the material in the heating receptacle, said means being adapted to be operated from the outside of said tube; and means for absorbing the gases resulting from the reaction of the heat generating material.

4. A pocket heating device comprising a barrel having a heat generating material associated therewith; means in said barrel for igniting the heat generating material, said means being adapted to be operated from the outside of said barrel in order to prevent the flames and gases from reaching the atmosphere; and means for absorbing the gases resulting from the reaction of the heat generating material.

5. A pocket heating device comprising a barrel; a heat generating receptacle secured to one end to said barrel, said receptacle having a heat generating material therein; an igniting device adapted to ignite the heat generating material and being adapted to be operated from the outside of said barrel in order to prevent the flames and gases from reaching the atmosphere; and a gas absorbing chamber having a gas absorbing material therein secured to the other end of said barrel, said gas absorbing material being adapted to absorb the gases resulting from the reaction of the heat generating material.

6. A pocket heating device comprising a barrel; a heat generating receptacle secured at one end to said barrel, said receptacle having a heat generating material therein and a dust collector for the material; an igniting device adapted to ignite the heat generating material and being adapted to be operated from the outside of said barrel in order to prevent the flames and gases from reaching the atmosphere; and a gas absorbing chamber having a gas absorbing material therein secured to the other end of said barrel, said gas absorbing material being adapted to absorb the gases resulting from the reaction of the heat generating material.

7. A pocket heating device comprising a barrel; a heat generating receptacle secured at one end to said barrel, said receptacle having a heat generating material therein and being hinged in order to refill the receptacle; an igniting device adapted to ignite the heat generating material and being adapted to be operated from the outside of said barrel in order to prevent the flames and gases from reaching the atmosphere; and a gas absorbing chamber having a gas absorbing material therein secured to the other end of said barrel, said gas absorbing material being adapted to absorb the gases resulting from the reaction of the heat generating material.

8. A pocket heating device comprising a barrel having a heat generating material associated therewith; means in said barrel for igniting the heat generating material, said means being adapted to be operated from the outside of said barrel in order to prevent the flames and gases from reaching the atmosphere; and means for absorbing the gases resulting from the reaction of the heat generating material, said igniting means comprising a reciprocating plunger having an ignition head which is adapted to ignite the heat generating material.

In testimony whereof I affix my signature.

ALFRED SCHWARTZ.